United States Patent [19]

Campbell

[11] 4,394,898
[45] Jul. 26, 1983

[54] METHOD AND APPARATUS FOR PROVIDING BALANCED STACKS OF DIAPERS

[75] Inventor: James F. Campbell, Green Bay, Wis.

[73] Assignee: Paper Converting Machine Company, Green Bay, Wis.

[21] Appl. No.: 256,915

[22] Filed: Apr. 23, 1981

[51] Int. Cl.³ ............... B65G 47/24; B65H 289/24
[52] U.S. Cl. .................... 198/374; 198/377; 271/185; 271/196
[58] Field of Search ............... 198/374, 377, 478; 414/31, 54; 271/194, 196, 195, 276, 185, 65; 53/446, 544

[56] References Cited

U.S. PATENT DOCUMENTS

| | | | |
|---|---|---|---|
| 1,887,008 | 11/1932 | Bogoslowsky | 198/374 X |
| 3,728,191 | 4/1973 | Wierzba et al. | 156/265 |
| 3,809,214 | 5/1974 | Reist | 198/374 |
| 4,015,724 | 4/1977 | Spencer | 414/31 |
| 4,118,024 | 10/1978 | Gerhardt | 271/65 X |
| 4,307,800 | 12/1981 | Joa | 198/374 |

Primary Examiner—Bruce H. Stoner, Jr.
Attorney, Agent, or Firm—Tilton, Fallon, Lungmus & Chestnut

[57] ABSTRACT

A method and apparatus for providing balanced stacks of diapers where a series of diapers are advanced toward a drum equipped with an even number of turning devices adapted for vacuum-actuated engagement of the diapers and cam means are associated with the drum for rotating alternate of the devices 90° to the right and the remainder of the devices 90° to the left so that adjacent diapers in the series are disposed 180° to each other.

14 Claims, 3 Drawing Figures

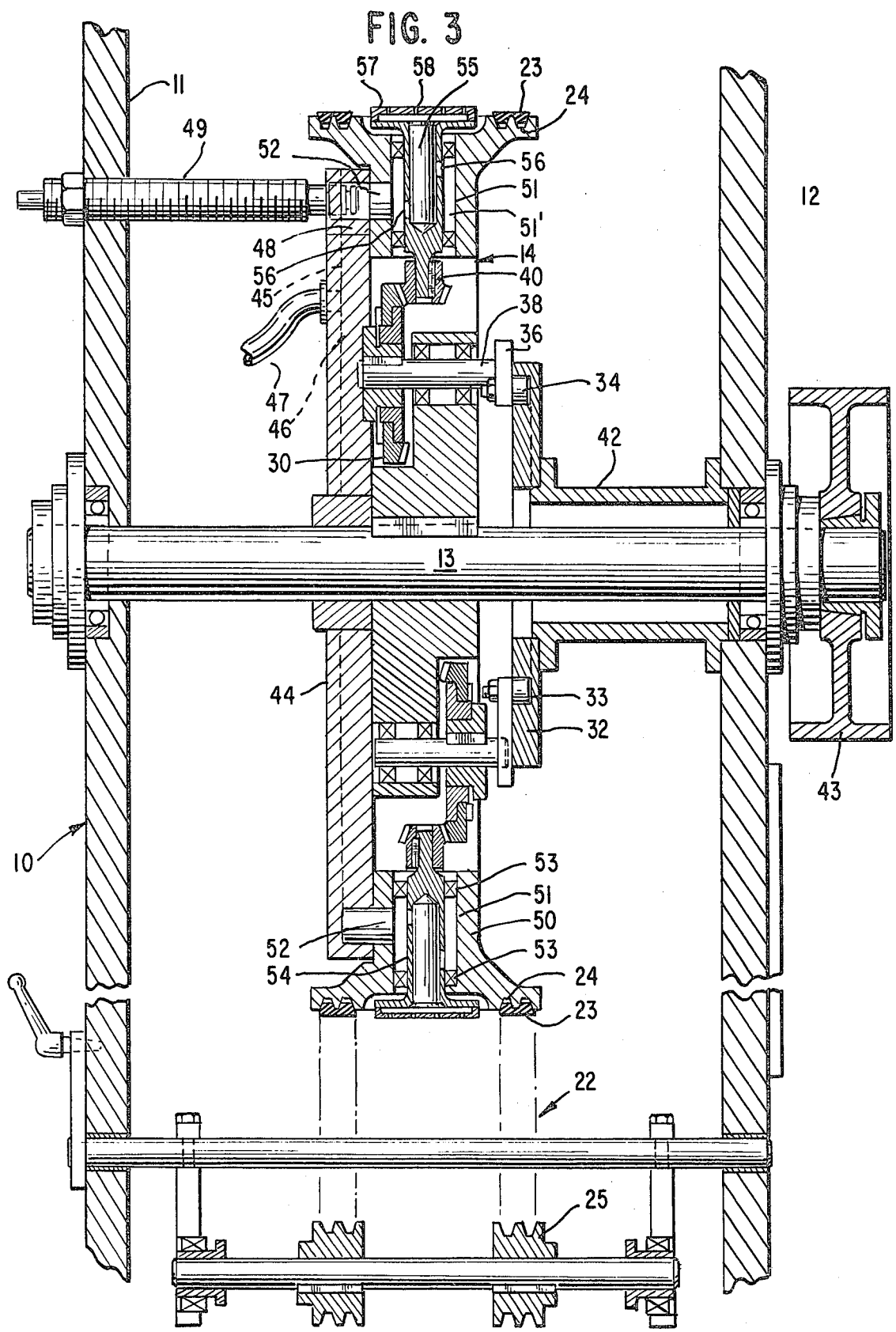

METHOD AND APPARATUS FOR PROVIDING BALANCED STACKS OF DIAPERS

BACKGROUND AND SUMMARY OF INVENTION

This invention relates to a method and apparatus for providing balanced stacks of diapers and, more particularly, to a method and apparatus for orienting a series of diapers where adjacent diapers are disposed 180 degrees to those adjacent.

The invention finds particular application to the packaging of disposable diapers. These diapers, like their historic cloth counterparts, are folded so as to develop a crotch which necessarily has greater thickness (by virtue of the fold) than the opposite free edge portions to be secured about the infant's waist. The concept of reversing products to develop balanced stacks is, of course, old. For example, the general idea was employed in coowned Spencer U.S. Pat. No. 4,015,724 relative to stacks of business forms.

In the handling of disposable diapers, however, the problems were different—because of handling a relatively bulky and extensive product at high speed. For example, contemporary diaper manufacturing machines produce approximately 300 units per minute. The time constraint of performing the necessary orientation in 1/5 second has not been adequately met by existing methods and apparatus. One currently employed expedient utilizes a pair of folding drums equipped with oscillating fingers to develop the 180 degrees alternate stacking. In other words, a first diaper was gripped by one drum and the crotch portion directed one way after which it was finger stripped and thereafter the next diaper was gripped by the adjacent drum with its crotch disposed the opposite way and that in turn stripped by a second finger means. This resulted in a method that was complicated and time-consuming and, more particularly, apparatus that was complicated and hence more subject to accelerated wear.

According to the invention, these problems have been solved through the use of a single drum interposed in the path of a stream of series of diapers from the diaper manufacturing machine and wherein the drum is equipped with vacuumized turning devices for sequentially turning the diapers alternates 90 degrees so as to develop the desired 180 degree orientation from adjacent diaper to adjacent diaper. Some of the mechanism employed is patterned after that disclosed in Wierzba and Spencer U.S. Pat. No. 3,728,191 which was employed for 90 degree turning of the tape-tabs employed to provide diaper fastenings. It was surprising, however, that such mechanism could be used to advantage in properly orienting the relatively ponderous diapers.

Other objects and advantages of the invention may be seen in the details of construction and operation set down in this specification.

DETAILED DESCRIPTION

The invention is described in conjunction with an illustrative embodiment in the accompanying drawing, in which:

FIG. 3 is an enlarged, fragmentary sectional view of the drum portion of FIG. 1 such as would be seen along the sight line 3—3 applied to FIG. 1.

Figure 1:
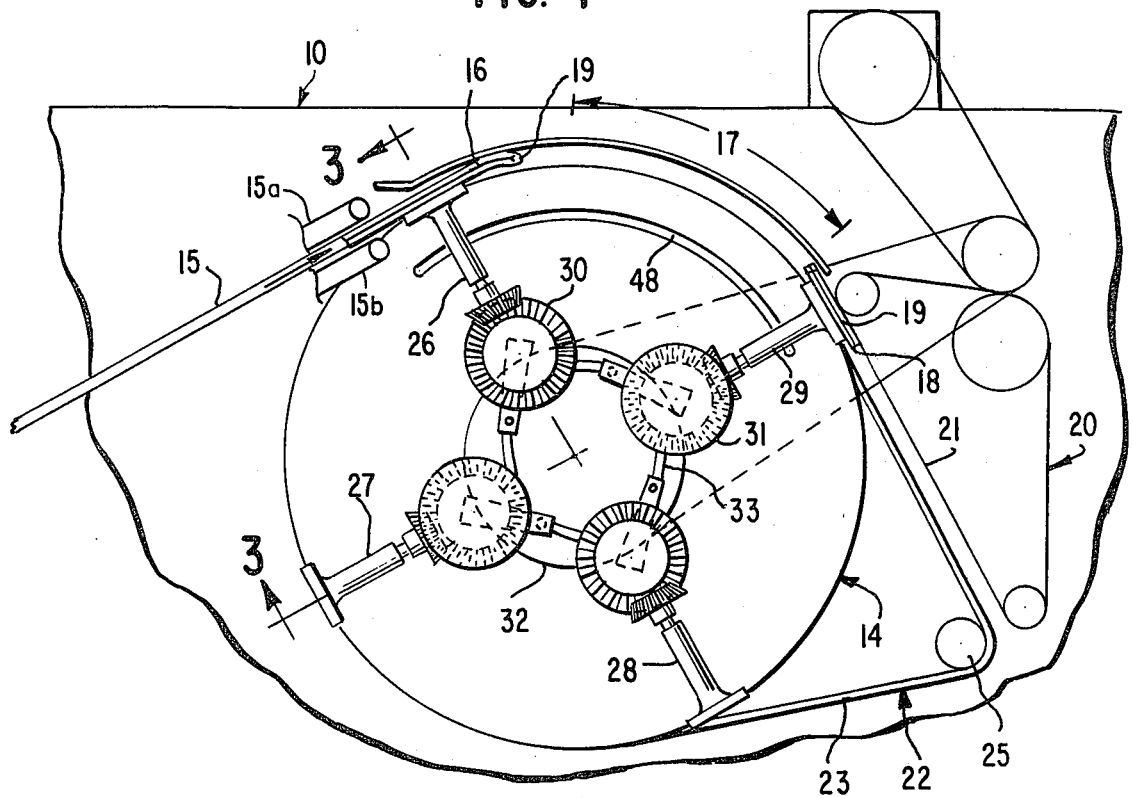
FIG. 1 is a fragmentary side elevational of a portion of a diaper manufacturing machine which features the portion employed to achieve the diaper orientation of the invention.

In the illustration given and with reference first to FIG. 1, the numeral 10 designates generally a diaper manufacturing machine which, as can be seen from FIG. 3, includes the usual side frames 11 and 12. Suitable cross tie members (not shown) are provided to integrate and rigidify the side frames 11 and 12. The side frames provide journals for various cross shafts such as the shaft 13 (see the central portion of FIG. 3) which rotatably supports the diaper turning drum generally designated 14.

Referring again to FIG. 1, the numeral 15 designates a delivery path provided by conveyor belts (15a, 15b) which provides a series or stream of identically oriented diapers for delivery to the drum 14. A completed diaper just leaving the delivery path 15 is designated 16 and is seen to be entering the turning zone 17. The diaper immediately preceding that designated 16 is designated 18 and is seen to be oriented 90 degrees so as to present only the crotch portion 19 to view. The diaper in the orientation 18 (or 180 degrees thereto) is then removed from the vicinity of the drum 10 by a removal system generally designated 20 and which includes an outer belt system 21 and a stripper belt system generally designated 22—see also the extreme lower portion of FIG. 3. The belts 23 of the stripper system 22 ride within grooves 24 of the drum 14. The belts 23 are reeved about pulleys as at 25 to help conduct the diapers 18 away from the drum 14.

Employed for turning the diapers 16 in the zone 17 are an even numbered plurality of turning devices as at 26, 27, 28 and 29. As can be appreciated from a consideration of FIG. 2, the turning device 26 turns its diaper 90 degrees counterclockwise whereas the preceding device 29 turned its associated diaper (while in the zone 17) 90 degrees clockwise. In the illustration given, the device 27 operates in the same fashion as the device 29 and the device 28 parallels that of device 26.

This is achieved by oppositely orienting the bevel gears 30 and 31 (still referring to FIG. 2) which are seen to be operating off of the same cam 32. As can be seen from FIGS. 1 and 3, the cam 32 is equipped with a cam follower groove 33 for this purpose.

Referring again to FIG. 2, the device 26 has associated therewith a cam follower 34 and the device 29 a cam follower 35 which follow the contour of the cam 32, i.e., ride within the groove 33. Each device 26 and 29 has a lever arm as at 36 and 37 respectively which are mounted on shafts 38 and 39 suitably journalled within the drum 14—see the upper central portion of FIG. 3 for the mounting of the shaft 38. The previously mentioned bevel gears 30 and 31 are affixed to the shafts 38 and 39 respectively. Completing the schematic presentation of FIG. 2, each device 26 and 29 includes a mating bevel gear as at 40 and 41, respectively.

The cam 32 (see FIG. 3) is fixed relative to the side frame 12 by means of a collar 42 which is disposed about the shaft 13. The shaft 13 in turn carries a gear 43 employed for turning the drum 14.

The devices 26-29, except for the alternate turning features, are essentially identical, particularly insofar as subjecting the same to vacuum so as to grip the associated diapers 16, 18, etc.

For applying vacuum in turn to the various devices 26–29 as they approach the turning zone 17, the apparatus 10 is equipped with a vacuum plate 44 (see the left central portion of FIG. 3). The vacuum plate is stationary, being fixed to the side frame 11 by means not shown.

A portion of the valve plate 44 is relieved as at 45 to provide an insert 46 for the purpose of communicating vacuum to the various devices. More particularly, a vacuum hose 47 (still referring to the upper left portion of FIG. 3) communicates to a source of vacuum not shown and also to an arcuate slot 48 provided in the insert 46. The arcuate slot 48 can also be seen in the upper central portion of FIG. 1. The insert 46 is adjustably mounted on the side frame 11 by means of an adjusting bolt 49.

The drum 14 includes a solid body 50 which is equipped with radial bores at four circumferentially spaced apart locations to accommodate the various turning devices 26–29—see the lower central portion of FIG. 3. Aligned with each radial bore 51 is an axial bore 52 in the body 50 which communicates the bore 51 in the drum body 50 with the slot 48 at the appropriate time of turning, i.e., when the particular turning device 26–29 is adjacent the turning zone 17.

Provided within the bore 51 are a pair of bearings 53 (designated only in the lower central portion of FIG. 3) which support the shank or stem 54 of each turning device. The stem 54 is equipped with a hollow chamber as at 55 (see the upper portion of FIG. 3)—and which communicates with the bore 51 via a plurality of openings 56. Additionally, the top pad-like portion or head 57 is equipped with a plurality of openings 58. Thus, when a particular turning device 26–29 is aligned with the slot 48, the vacuum condition in the hose 47 is communicated through the slot 48, the axial bore 52, the radial bore 51, the wall openings 56, the hollow chamber 55 and the openings 58 so as to enable the enlarged head portion or pad-like part 57 to grip the diaper 16 for turning the same. Advantageously, the vacuum is applied to the turning device for a time longer than that just required for the turning itself. This insures that there will be an adequate grip on the diaper between the time it is issuing from the delivery means 15 until it is taken over by the removing means 20. Advantageously, the vacuum slot 48 may extend over approximately 120 degrees of arc with blanking means or plugs being available for shortening the effective length of vacuum slot.

OPERATION

Each vacuumized turning device 26–29 is part of and rotates with the central drum 14, but is connected to vacuum by means of the hose 47 (see FIG. 3) by the coacting relationship of the slot 48 in the insert 46 carried by the vacuum plate 44. In practice, a small amount of clearance is maintained between the fixed valve or plate 44 and the rotating drum body 50 in order to minimize wear and still yield an effective vacuum seal—of the order of 0.014" (0.36 mm), generally within the range of 0.1 to 1.0 mm. Each of the vacuumized devices 26–29 consist of a top pad-like portion 57 drilled with small openings 58 and connecting with the central vacuum chamber 55. The vacuumized pad stem body 54 rotates in bearings 53 within the housing 50 and by means of several holes 56 drilled through the stem body 54, the top portion 57 connects with the primary vacuum source 47 through the openings 56, annular chamber 51' which surrounds the entire stem 54 and through the aperture or bore 52 which is a hole drilled through the sidewall of the housing 50.

It will be appreciated that as the turning devices 26–29 rotate, each of the several holes 56 will be maintained in contact with the outside chamber 51' which is vacuumized when the bore 52 in housing 50 rotates to be in coincidence with the vacuum slot 48 of the vacuum valve 44.

Each of the turning devices 26–29 is rotatable about a radial center line and regardless of the rotation about the radial center line will always be in communication with the vacuum chamber 51 through the several openings 56. However, the annular vacuum chamber 51 surrounding each of the stems 54 will only be connected to the vacuum source when the bore 52 is in communication with the vacuum slot 48—this occurring over approximately 90 degrees of drum rotation—during which time each of the turning devices can be rotated 90 degrees, either clockwise from machine direction or counterclockwise from machine direction.

Figure 2:
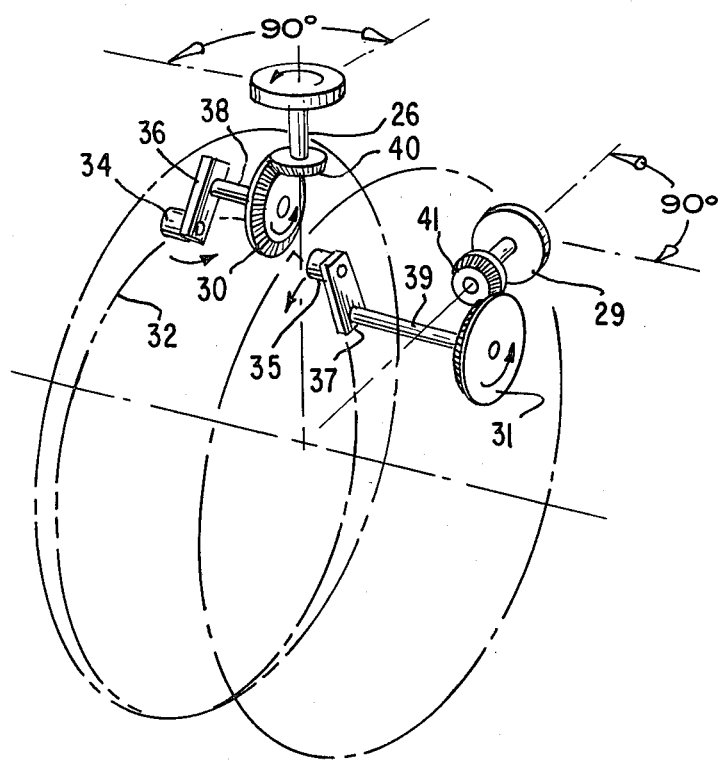
FIG. 2 is a fragmentary perspective view somewhat schematic of two of the turning devices associated with the drum portion of the machine of FIG. 1.

The rotating assemblies—such as the two illustrated in FIG. 2, are shown with arrows to illustrate how a force on the cam followers 34 and 35 acting through lever arms 36 and 37 rotates the shafts 38 and 39 to which bevel gears 30 and 31 are attached. These in turn coact with bevel gears 40 and 41 which are affixed to the stems 54 of the turning devices 26–29. The force is applied by the profile of the cam follower slot 33 which deviates from a circular orbit by the amount of cam movement. The slot 33 thus has a major portion of its length in orbital relation to the axis of rotation, i.e., the shaft 13.

It will be noted that alternate bevel gears 30 and 31 are on opposite sides of consecutive double bevel gears and thus, in rotating about the drum will cause clockwise rotation in a pad (such as at 29) and counterclockwise rotation in the adjacent pads such as at 26—even as the associated cam followers 34 and 35 are similarly affected by the same cam profile and movement as defined by the groove 33.

When the cam followers 34, 35, etc. are controlled by the contour of the cam track groove 33, a turning motion is imparted of substantial angularity because the gear ratio between the bevel gears 30, 40 or 31, 41 is approximately 4 to 1. It will thus become evident that only a small displacement of the cam followers is required to effect a 90 degree rotation of the turning devices. As illustrated, the heads 57 of the various turning devices protrude slightly beyond the periphery of the drum 14.

While in the foregoing specification, a detailed description of an embodiment of the invention has been set down for the purpose of illustration, many variations in the details hereingiven may be made by those skilled in the art without departing from the spirit and scope of the invention.

I claim:

1. A method of arranging diapers for balanced stacking comprising advancing a series of diapers all in a particular orientation along a predetermined path toward a rotating drum, vacuum gripping each diaper in sequence for travel on said drum, rotating alternate diapers in said series 90 degrees to the right about an axis extending radially of said drum and rotating the remaining diapers in said series 90 degrees to the left also about an axis extending radially of said drum, and removing said series of diapers from said drum before completion of a drum rotation to provide a stream of diapers for stacking wherein each diaper is oriented 180 degrees relative to the next adjacent diaper.

2. The method of claim 1 in which said alternate rotating is achieved within less than about a 120 degree zone of drum movement.

3. The method of claim 1 in which each of said diapers is engaged at approximately the same spot in successive diapers.

4. Apparatus for orienting diapers and the like comprising a frame, a drum mounted on said frame, means on said frame for rotating said drum, means operably associated with said frame for delivering a series of diapers to the surface of said drum for travel thereon, means for removing said series after traveling on said drum, said drum being equipped with an even-numbered plurality of turning devices for vacuum engagement of said diapers, and said drum being equipped with means for rotating alternate of said turning devices 90 degrees in one direction and the remaining turning devices 90 degrees in the opposite direction whereby adjacent diapers on said removing means are oriented 180 degrees relative to each other to facilitate balanced stacking.

5. The structure of claim 4 in which each of said turning devices includes a member having a perforated head positioned in the surface of said drum, a stem extending generally radially of said drum from said head, passage means in said stem coupling the head perforations to a source of vacuum, said rotating means including gear means operably associated with said stem.

6. The structure of claim 5 in which said rotating means further includes cam means interposed between said gear means and said frame.

7. The structure of claim 5 in which said frame is equipped with a vacuum manifold for communication with said passage means over a minor portion of the circumference of said drum.

8. Apparatus for the balanced stacking of diapers and the like comprising a frame, means on said frame for advancing serially a plurality of diapers toward a reorientation station, a drum on said frame constituting said reorientation station, means on said frame for rotating said drum about a predetermined axis, a cam mounted on said frame on one side of said drum and providing a closed path for a cam follower, said closed path having a major portion of its length in orbital relationship to said axis, a vacuumized valve plate on said frame on the other side of said drum and having an arcuate slot therein, said slot also being in orbital relation to said axis and being generally axially aligned with the remaining portion of said path, and an even plurality of diaper turning devices equally circumferentially spaced apart on said drum in radial relation to said axis, means coupling said devices to said cam for rotating alternate of said devices 90 degrees to the right and for rotating the remaining of said devices 90 degrees to the left and for coupling said devices to said arcuate slot for vacuum gripping said diapers during turning thereof.

9. The structure of claim 8 in which said coupling means includes a pair of bevel gears for each turning device, one gear of each pair being mounted directly on its associated device and being rotatable about a drum radius, the other gear of each pair being coupled to a cam follower moving in said closed path, alternate of said other gears being on the cam side of said drum and the others being on the valve plate side of said drum.

10. The structure of claim 9 in which each turning device includes a radially extending stem journalled for rotation in said drum, said one gear being mounted on the inner end of said stem, said stem being equipped with an enlarged diaper gripping head at its outer end, and air passage means in said head and stem for vacuumized gripping of said diapers.

11. The structure of claim 10 in which said head protrudes slightly beyond the periphery of said drum.

12. The structure of claim 10 in which said air passage means includes a hollow space in said stem and a plurality of openings in said head communicating therewith, the walls of said stem about said space being equipped with further openings for communication with said slot.

13. The structure of claim 12 in which said drum is equipped with a radial bore for each device, a pair of spaced apart bearings in said bore for journalling said stem, the space between said bearings being an annulus axially aligned with said further openings, said drum being equipped with an axially extending bore for each device aligned with said annulus for selectively coupling the same to said arcuate slot for vacuumizing said head.

14. The structure of claim 8 in which said valve plate is spaced from about 0.1 to about 1.0 millimeter from said drum.

* * * * *